US012805579B2

(12) United States Patent
Pilatowicz

(10) Patent No.: US 12,805,579 B2
(45) Date of Patent: Nov. 24, 2026

(54) METHOD FOR CONTROLLING AN AEROSOL GENERATING DEVICE

(71) Applicant: JT International SA, Geneva (CH)

(72) Inventor: Grzegorz Aleksander Pilatowicz, Grens (CH)

(73) Assignee: JT International SA, Geneva (CH)

( * ) Notice: Subject to any disclaimer, the term of this patent is extended or adjusted under 35 U.S.C. 154(b) by 638 days.

(21) Appl. No.: 18/005,307

(22) PCT Filed: Jul. 8, 2021

(86) PCT No.: PCT/EP2021/069069
§ 371 (c)(1),
(2) Date: Jan. 12, 2023

(87) PCT Pub. No.: WO2022/013073
PCT Pub. Date: Jan. 20, 2022

(65) Prior Publication Data

US 2023/0276860 A1 Sep. 7, 2023

(30) Foreign Application Priority Data

Jul. 14, 2020 (EP) .................................... 20185794

(51) Int. Cl.
*A24F 40/57* (2020.01)
*A24F 40/20* (2020.01)
(Continued)

(52) U.S. Cl.
CPC .............. *A24F 40/57* (2020.01); *A24F 40/20* (2020.01); *A24F 40/465* (2020.01); *A24F 40/51* (2020.01);
(Continued)

(58) Field of Classification Search
CPC ............................... A24F 40/465; A24F 40/57
See application file for complete search history.

(56) References Cited

U.S. PATENT DOCUMENTS 10,045,567 B2 * 8/2018 Monsees ............... H02J 7/0034
10,561,172 B2 * 2/2020 Armoush ................ A24F 40/40
(Continued)

FOREIGN PATENT DOCUMENTS

CN 106028846 A 10/2016
CN 109792801 A 5/2019
(Continued)

OTHER PUBLICATIONS

International Search Report for PCT/EP2021/069069 mailed Oct. 18, 2021. 4 pgs.

*Primary Examiner* — Russell E Sparks
(74) *Attorney, Agent, or Firm* — Lerner David LLP

(57) ABSTRACT

A method for controlling an aerosol generating device comprises receiving operating parameters of the aerosol generating device; determining an estimated temperature of a susceptor disposed within a consumable for the aerosol generating device based on the operating parameters; and controlling the power supplied to the inductor based on the estimated temperature of the susceptor. The operating parameters of the aerosol generating device comprise: ambient temperature; and an aspect of a power supplied to an inductor of the aerosol generating device. The estimated temperature of the susceptor is determined during an induction heating of the susceptor by the inductor.

20 Claims, 4 Drawing Sheets

(51) Int. Cl.

| | |
|---|---|
| ***A24F 40/465*** | (2020.01) |
| ***A24F 40/51*** | (2020.01) |
| ***G05D 23/19*** | (2006.01) |
| ***H05B 6/06*** | (2006.01) |
| ***H05B 6/10*** | (2006.01) |

(52) U.S. Cl.

CPC ........... *G05D 23/1917* (2013.01); *H05B 6/06* (2013.01); *H05B 6/105* (2013.01)

(56) References Cited

U.S. PATENT DOCUMENTS

| | | | | |
|---|---|---|---|---|
| 10,588,347 | B2 * | 3/2020 | Malgat | A24D 1/20 |
| 10,874,139 | B2 * | 12/2020 | Alvarez | A61M 15/06 |
| 11,589,622 | B2 * | 2/2023 | Lee | A24F 40/57 |
| 12,004,566 | B2 * | 6/2024 | Korus | A24F 40/465 |
| 12,514,295 | B2 * | 1/2026 | Forster | A24F 40/465 |
| 2016/0309782 | A1 | 10/2016 | Malgat et al. | |
| 2017/0055585 | A1 | 3/2017 | Fursa et al. | |
| 2019/0200677 | A1 | 7/2019 | Chong et al. | |
| 2019/0269174 | A1 | 9/2019 | Robert et al. | |
| 2019/0364973 | A1 | 12/2019 | Kaufman et al. | |
| 2020/0022412 | A1 | 1/2020 | Abi Aoun et al. | |
| 2020/0367569 | A1 | 11/2020 | Farine | |
| 2021/0059309 | A1 | 3/2021 | Gill | |
| 2021/0112870 | A1 * | 4/2021 | Park | A24F 40/51 |
| 2022/0117307 | A1 * | 4/2022 | Abi Aoun | A24F 40/50 |

FOREIGN PATENT DOCUMENTS

| | | | |
|---|---|---|---|
| CN | 110476477 | A | 11/2019 |
| CN | 111356378 | A | 6/2020 |
| JP | 2017501805 | A | 1/2017 |
| JP | 2017516256 | A | 6/2017 |
| JP | 2019535242 | A | 12/2019 |
| JP | 2020038842 | A | 3/2020 |
| JP | 2020516014 | A | 5/2020 |
| JP | 2021510500 | A | 4/2021 |
| JP | 2021514177 | A | 6/2021 |
| KR | 20190090070 | A | 7/2019 |
| WO | 2019129844 | A1 | 7/2019 |
| WO | 2020008008 | A1 | 1/2020 |
| WO | 2020130752 | A1 | 6/2020 |

* cited by examiner

METHOD FOR CONTROLLING AN AEROSOL GENERATING DEVICE

The present application is a national phase entry under 35 U.S.C. § 371 of International Application No. PCT/EP2021/069069, filed on Jul. 8, 2021, published in English, which claims priority from European Application No. 20185794.3, filed on Jul. 14, 2020.

The present invention relates to a method and apparatus for controlling an aerosol generating device. In particular, the method involves estimating a temperature within a consumable for an aerosol generating device. The disclosure is particularly applicable to portable aerosol generating devices, which may heat, rather than burn, tobacco or other suitable aerosol substrate materials through an induction heating of a susceptor disposed within the consumable.

The popularity and use of reduced-risk or modified-risk devices (also known as vaporisers) has grown rapidly in the past few years as an aid to assist habitual smokers wishing to quit using traditional tobacco products such as cigarettes, cigars, cigarillos, and rolling tobacco. Various devices and systems are available that heat or warm aerosolisable substances as opposed to burning tobacco in conventional tobacco products.

A commonly available reduced-risk or modified-risk device is the heated substrate aerosol generation device or heat-not-burn (HNB) device. Devices of this type generate an aerosol or vapour by heating an aerosol substrate (i.e. consumable) that typically comprises moist leaf tobacco or other suitable aerosolisable material to a temperature typically in the range 150° C. to 300° C. Heating an aerosol substrate, but not combusting or burning it, releases an aerosol that comprises the components sought by the user but not the by-products of combustion and burning. In addition, the aerosol produced by heating the tobacco or other aerosolisable material does not typically comprise the burnt or bitter taste that may result from combustion that can be unpleasant for the user.

In certain heat-not-burn devices, an induction coil may be used to inductively heat a susceptor disposed within the aerosol substrate, and the thermal energy is transferred from the susceptor to the surrounding substrate. However, in such devices, as the susceptor is isolated within the aerosol substrate, it may be difficult to monitor the heating process and precisely control the aerosol generating properties of the device.

For example, inadequate information about the conditions within the aerosol substrate may lead to a vapour temperature that is too hot or too cold, which may result in an unpleasant user experience or a safety hazard for user. Moreover, it may not be possible to ensure a consistent vaping experience, i.e. it may not be possible to provide the same puff-by-puff, consumable-by-consumable, and/or taste-by-taste vaping quality.

An object of the present invention is to address one or more of these issues.

According to a first aspect of the present invention, there is provided a method for controlling an aerosol generating device, comprising: receiving operating parameters of the aerosol generating device, wherein the operating parameters comprise: ambient temperature; and an aspect of a power supplied to an inductor of the aerosol generating device; determining an estimated temperature of a susceptor disposed within a consumable for the aerosol generating device based on the operating parameters, wherein the estimated temperature is determined during an induction heating of the susceptor by the inductor; and controlling the power supplied to the inductor based on the estimated temperature of the susceptor.

In this way, a method of monitoring the induction heating process is provided which does not require a temperature sensor to be disposed within the consumable. As a consequence, the power supplied to the inductor may be varied in accordance with the estimated temperature of the susceptor in order to adjust the temperature of the consumable and control the aerosol generating properties of the device. The temperature of the susceptor may be estimated using a thermal model which outputs a value of the internal temperature within the consumable. Advantageously, the ambient temperature and the power supplied to the inductor are easily measurable parameters which are able to provide a reliable estimation of the internal temperature of the consumable, and thus a reliable estimation of the temperature of the susceptor disposed within the consumable.

The temperature of the consumable may be controlled using a closed-loop control system. Hence, the temperature and heating of the consumable may be regulated without requiring human interaction. The heat generated by the susceptor, which is transferred to the surrounding consumable, may be controlled in accordance with the estimated temperature of the susceptor. Advantageously, this may protect the susceptor and consumable from overheating or may ensure vapour is produced at an optimal temperature. In one example, the heating of the susceptor may be controlled such that the temperature of the susceptor follows a pre-characterised temperature profile.

Preferably, the method further comprises measuring the ambient temperature and an aspect of the power supplied to the inductor of the aerosol generating device.

Preferably, the aspect of the power supplied to the inductor comprises at least one of: current supplied to the inductor; voltage supplied to the inductor; and wattage supplied to the inductor.

Preferably, the power supplied to the inductor is controlled using a proportional-integral-derivative, PID, controller. In this way, a control loop feedback mechanism is used to provide accurate and responsive corrections to the temperature of the susceptor, based on the estimated temperature of the susceptor.

Preferably, the power supplied to the inductor is controlled based on the difference between the estimated temperature of the susceptor and a target temperature of the susceptor. For example, the PID controller may continuously calculate an error value as the difference between the target temperature and the estimated temperature and apply a correction based on proportional, integral, and derivative terms.

Preferably, the method further comprises suspending power supply to the inductor when the estimated temperature of the susceptor reaches a threshold value. In this way, the consumable may be prevented from overheating.

Preferably, the estimated temperature of the susceptor is determined based on the operating parameters of the aerosol generating device and based on thermal properties of the consumable. Preferably, the thermal properties of the consumable comprise: thermal capacity; and thermal resistance. In particular, the thermal properties of the consumable may be the properties of an aerosol substrate or aerosol generating material within the consumable, for example the thermal capacity and thermal resistance of tobacco. In this way, a thermal model may be used to estimate the temperature at a point in the centre of the consumable, using the ambient temperature and the power supplied to the inductor as measured variables, and using the thermal capacity and the thermal resistance of the consumable as fixed parameters.

Preferably, the method further comprises updating the thermal properties of the consumable during the induction heating of the susceptor. It is known that the properties (e.g. thermal properties) of the consumable may vary over the heating operation. For example, the thermal capacity of tobacco is known to increase as the moisture content of the tobacco increases or as the temperature of the tobacco increases. Moreover, the thermal resistance of tobacco is known to decrease as the temperature of the tobacco increases. Thus, it is advantageous to correct and update the thermal properties of the consumable during the heating operation. In this way, a more accurate estimation of the temperature of the susceptor may be provided.

Preferably, the method further comprises measuring, using a temperature sensor, a temperature at an exterior surface of the consumable; and updating the thermal properties of the consumable based on the measured temperature. The temperature measured at an exterior surface of the consumable is dependent on the internal temperature of the consumable, the power induced in the susceptor, the thermal capacity of the consumable, and the thermal resistance of the consumable. Hence, the thermal capacity and thermal resistance may be updated during the heating process based on the temperature measured at the exterior surface of the consumable and its relationship to the operating parameters of the aerosol generating device.

Preferably, the method further comprises calculating an estimated temperature at the exterior surface of the consumable; and updating the thermal properties of the consumable based on the difference between the measured temperature at the exterior surface of the consumable and the estimated temperature at the exterior surface of the consumable.

Preferably, the updated properties of the consumable are determined using at least one of: an extended Kalman filter; a recursive least-square filter; a variation of parameters method; or a characteristic mapping method.

According to another aspect of the invention, there is provided an aerosol generating device comprising processing circuitry configured to perform the above method, and a temperature sensor configured to measure the ambient temperature.

According to another aspect of the invention, there is provided a computer-readable medium comprising executable instructions which, when executed by processing circuitry, cause the processing circuitry to perform the above method.

According to an another aspect of the invention, there is provided a computer program product comprising instructions which, when the program is executed by processing circuitry, cause the processing circuitry to perform the above method.

Embodiments of the invention are now described, by way of example, with reference to the drawings, in which.

Figure 1:
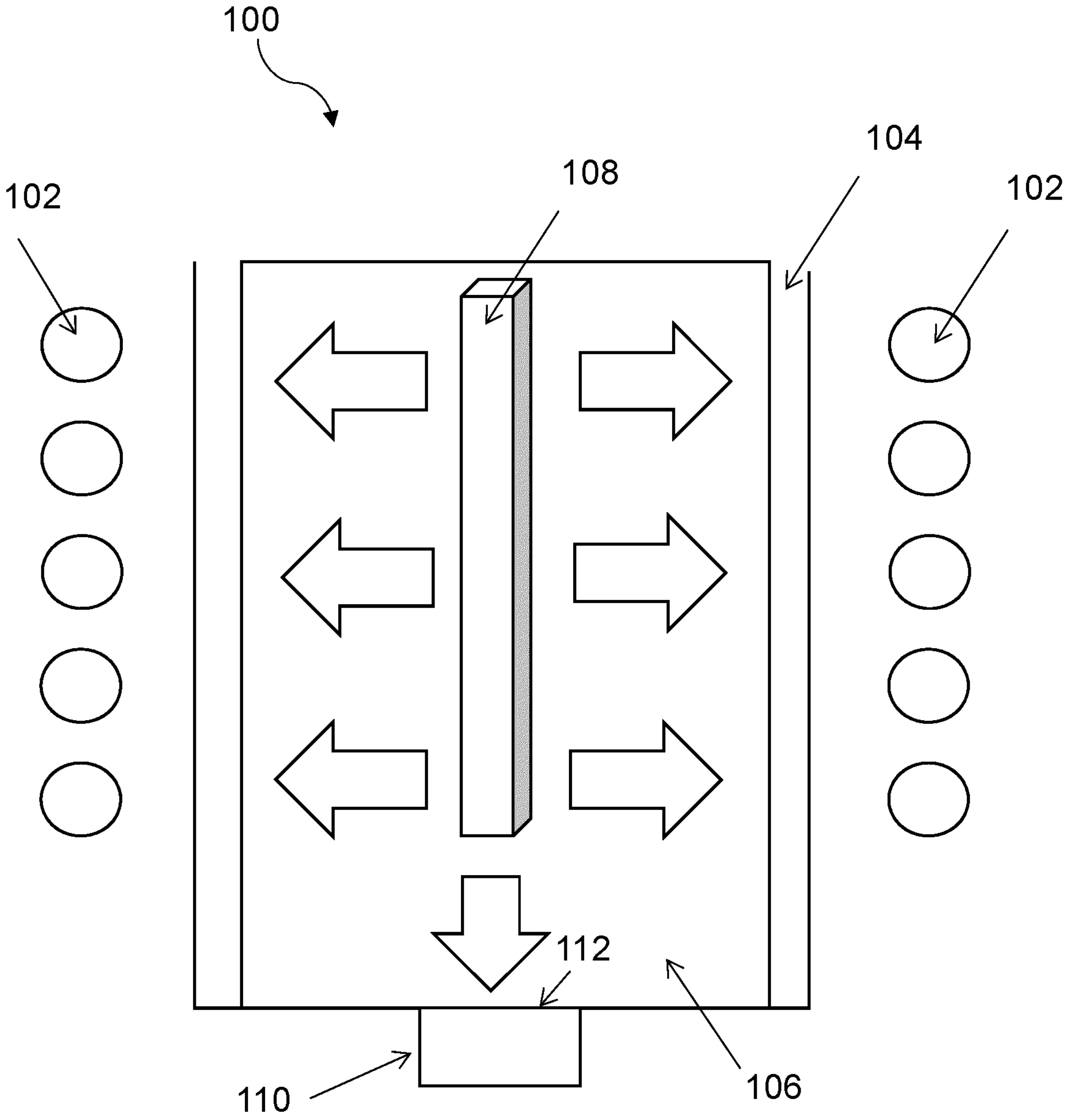
FIG. 1 is a schematic view of the internal components of an aerosol generating device in an embodiment of the invention.

FIG. 1 is a schematic view of the internal components of an aerosol generating device 100 in an embodiment of the invention. The aerosol generating device 100 is a heat-not-burn-device which utilises an induction heating system to generate an aerosol (also known as a vapour). In particular, the aerosol generating device 100 comprises one or more inductors 102 and a heating chamber 104 configured to receive a consumable 106. Each inductor 102 typically comprises a wire, or other conductor, wound into a coil around a magnetic core. The consumable 106 comprises aerosol generating material such as tobacco or other suitable material that releases an aerosol when heated to an aerosolisation temperature. A susceptor 108 is disposed within the consumable 106 such that the susceptor 108 is surrounded by aerosol generating material. Preferably, the susceptor 108 is located at the centre, or core, of the consumable 106. For example, the consumable 106 may comprise a rod of aerosol generating material and the susceptor 108 may be located at a middle position along the cylindrical axis of the rod. The susceptor 108 comprises an electrically conductive material such as graphite, silicon carbide, molybdenum, or stainless steel.

In use, a power source such as a battery (not depicted) is used to generate a high-frequency alternating current. The current is supplied to the one or more inductors 102 and a time-varying magnetic field is generated. The susceptor 108 is located within the generated magnetic field and the alternating electromagnetic field induces eddy currents in the susceptor 108. This heats the susceptor 108 and the susceptor 108 transfers the heat energy to the surrounding aerosol generating material of the consumable 106, thereby increasing the temperature of the consumable 106. When the consumable 106 (i.e. aerosol generating material) exceeds the aerosolisation temperature, an aerosol is produced which may be inhaled by a user.

The aerosol generating device 100 further comprises a temperature sensor 110 disposed within (or adjacent to) the heating chamber 104. The temperature sensor 110 is configured to interface with the consumable 106 received within the heating chamber 104 and measure the temperature of the consumable 106. In this way, the temperature sensor 110 is operable to measure the temperature of the consumable 106 at an exterior surface 112 of the consumable 106. Preferably, the exterior surface 112 is a surface of exposed aerosol generating material such that the temperature sensor 110 interfaces with the aerosol generating material held within the consumable 106.

In one example, the temperature sensor 110 may be a resistance temperature detector such as a platinum resistance thermometer (PRT). In other examples, the temperature sensor 110 may be an alternative type of temperature sensor such as a thermocouple, a negative temperature coefficient (NTC) thermistor, or a semi-conductor based sensor.

The skilled person will appreciate that, in some embodiments, the temperature sensor 110 may be absent.

The aerosol generating device 100 may further comprise processing circuitry (not depicted) for controlling the operation of the components of the aerosol generating device 100.

Figure 2:
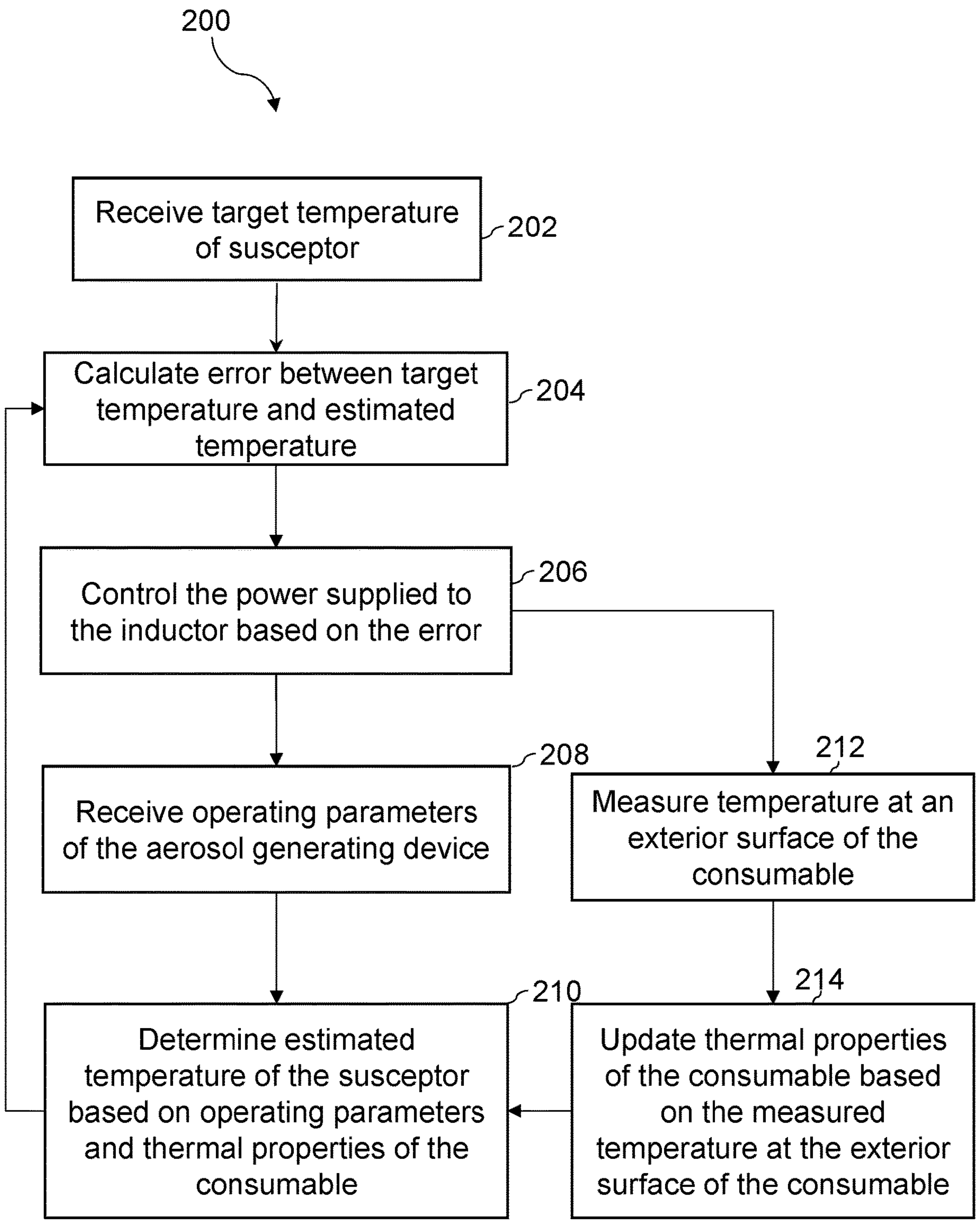
FIG. 2 is a flowchart showing method steps for operation of an aerosol generating device in an embodiment of the invention.

FIG. 2 illustrates a method 200 of operating an aerosol generating device 100 in an embodiment of the invention.

At step 202, a target temperature of the susceptor 102 is received at the aerosol generating device 100. For example, the target temperature may be predefined in the processing circuitry. Additionally or alternatively, a target temperature profile may be received at the aerosol generating device 100, such that the target temperature varies throughout the heating operation. For example, the target temperature may be higher at an initial stage of the heating operation.

At step 204, an error (e.g. difference) between the target temperature and an estimated temperature of the susceptor 108 is calculated. The estimated temperature of the susceptor 108 will be discussed further below. The error may be calculated by the processing circuitry.

At step 206, the power supplied to the one or more inductors 102 is controlled based on the estimated temperature of the susceptor 108. In particular, the power supplied to the one or more inductors 102 is controlled based on the error between the target temperature and the estimated temperature of the susceptor 108. For example, if the estimated temperature of the susceptor 108 is below a target temperature of the susceptor 108, the power supplied to the one or more inductors 102 may be increased. Similarly, if the estimated temperature of the susceptor 108 is above the target temperature of the susceptor 108, the power supplied to the one or more inductors 102 may be decreased. In this way, the temperature of the susceptor 108 may be determined without requiring a temperature probe to be disposed within the consumable 106, and the temperature of the consumable 106 may be subsequently regulated to protect the susceptor 108 and the consumable 106 from overheating and/or to ensure that vapour is produced at an optimal temperature.

The power supplied to the one or more inductors 102 may be controlled using a proportional-integral-derivate (PID) controller. The PID controller calculates an error value as the difference between the target temperature and the estimated temperature of the susceptor 109, and adjusts the power supplied to the one or more inductors 102 based on proportional, integral, and derivative terms.

In some examples, the amount of power supplied to the one or more inductors 102 may also be controlled based on an energy transfer efficiency from the one or more inductors 102 to the susceptor 108. The energy transfer efficiency is the ratio of energy which is transferred to useful heat energy in the susceptor 108, compared to the total energy supplied to the one or more inductors 102. For example, if the energy transfer efficiency is 0.4, then 40 W of power supplied to the one or more inductors would produce 16 W of power at the susceptor. The energy transfer efficiency of the aerosol generating device 100 may be pre-characterised during product development.

At step 208, operating parameters of the aerosol generating device 100 are received at the aerosol generating device 100. The operating parameters comprise (and optionally consist of) the power supplied to the one or more inductors 102 and the ambient temperature of the aerosol generating device 100. In particular, the ambient temperature corresponds to the temperature of the aerosol generating device 100 away from the heating chamber 104 (i.e. at a location not influenced by the heating effect of the susceptor 108). For example, the ambient temperature may correspond to a temperature measured at the processing circuitry (e.g. circuit board or controller) of the aerosol generating device 100. Thus, the ambient temperature preferably corresponds to the initial temperature of the consumable 106 before the heating process has begun.

Optionally, the method 200 may further comprise measuring the power supplied to the one or more inductors 102 and measuring the ambient temperature of the aerosol generating device 100. For example, the power supplied to the one or more inductors 102 may be measured using a wattmeter (e.g. current and voltage sensor) at the one or more inductors 102. The ambient temperature may be measured using a temperature sensor disposed at a position away from the heating influence of the susceptor 108, e.g. at the processing circuitry.

At step 210, the estimated temperature of the susceptor 108 is determined. This is achieved by estimating the internal temperature of the consumable 106. In particular, the temperature at a single point within the consumable 106 may be estimated, corresponding to the location of the susceptor 108. In one example, the temperature at the centre of the consumable 106 may be estimated.

The estimated temperature of the susceptor 108 is calculated based on the power supplied to the one or more inductors 102 and the ambient temperature of the aerosol generating device 100, i.e. the operating parameters. The calculation is also based on the thermal properties of the consumable 106. In particular, the thermal properties comprise (and optionally consist of) thermal resistance and thermal capacity of the consumable 106 (i.e. the thermal resistance and thermal capacity of the aerosol generating material within the consumable 106, e.g. tobacco).

Initial (e.g. default) values for the thermal resistance and thermal capacity may be measured and/or calculated prior to the first operation of the aerosol generating device 100, i.e. before the consumable 106 has been heated. For example, the initial values may be pre-characterised during product development of the aerosol generating device 100.

However, it is known that the thermal properties of the consumable 106 are liable to change during the heating process. For example, the thermal capacity of tobacco is known to increase as the moisture content of the tobacco increases or as the temperature of the tobacco increases. Moreover, the thermal resistance of tobacco is known to decrease as the temperature of the tobacco increases. Thus, in some embodiments, the thermal properties of the consumable 106 may be updated or adjusted during the heating operation, i.e. the method 200 may further comprise steps 212 and 214.

At step 212, a temperature at an exterior surface 212 of the consumable 106 is measured by a temperature detector 110. Preferably, the exterior surface 212 is an exposed surface of aerosol generating material such that the temperature of the aerosol generating material is measured by the temperature detector 110.

At step 214, the thermal properties of the consumable 106 (e.g. the thermal properties of the aerosol generating material) are updated. In particular, the thermal resistance and the thermal capacity of the consumable 106 are updated based on the temperature measured at the exterior surface 212 of the consumable 108. This may be achieved by comparing the measured temperature at the exterior surface 112 of the consumable 108 to an estimated temperature at the exterior surface 112 of the consumable 108, and calculating corrected values of the thermal resistance and the thermal capacity based on the error, e.g. calculating adjusted values of thermal resistance and the thermal capacity which minimise the error. The process of updating the thermal properties will be discussed in further detail later with reference to FIG. 4.

The updated thermal properties are then used in step 210, where the estimated temperature of the susceptor 108 is calculated based on the operating parameters of the aerosol generating device 100 and the thermal properties of the consumable 106.

Of course, the skilled person will appreciate that steps 212 and 214 are optional and, in some embodiments, the thermal properties of the consumable 106 may not be updated during the heating process. In this case, the initial (e.g. default) values for thermal resistance and thermal capacity will always be used at step 210 when calculating the estimated temperature of the susceptor 108, and not just during the first cycle of method 200.

The temperature estimation may be performed at the processing circuitry, which may utilise a thermal model such as that discussed with reference to FIG. 3. For example, the thermal model may receive the power supplied to the one or more inductors 102 and the ambient temperature of the aerosol generating device 100 (i.e. the operating parameters) as inputs. The thermal model may also receive and/or have access to the thermal resistance and thermal capacity of the consumable 106. At the outset, the thermal model may receive the initial (e.g. default) values for the thermal resistance and thermal capacity of the consumable 106. However, once the heating operation begins, the thermal model may receive updated value for the thermal resistance and thermal capacity of the consumable 106. Using these values, the thermal model may output the estimated temperature of the susceptor 108.

In one example, the power supply to the one or more inductors 102 may be suspended when the estimated temperature of the susceptor 108 reaches a threshold value. For example, this may prevent the consumable 106 from overheating or may allow for an adaptable pre-heating period of the consumable wherein the consumable 106 is pre-heated until the internal temperature of the consumable 106 reaches the threshold value.

After step 210, the method 200 loops back to step 204, where the estimated temperature of the susceptor 108 determined at step 210 is compared to the target temperature of the susceptor 108, and a new error calculated. The power supplied to the one or more inductors 102 is adjusted at step 206 using the newly calculated error, the adjusted value of the power supplied to the one or more inductors 102 is received at step 208, and so forth.

Figure 3:
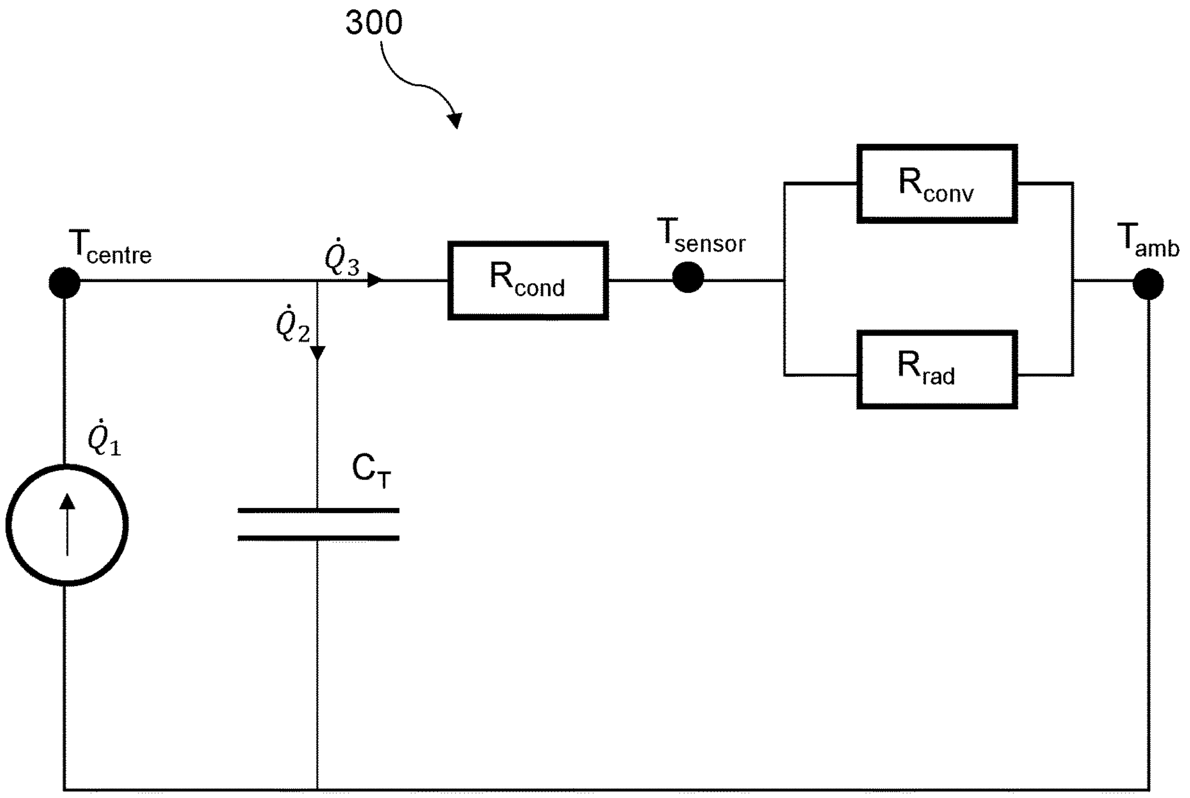
FIG. 3 is a schematic diagram showing a thermal model used for estimating the temperature of a susceptor within a consumable of an aerosol generating device.

FIG. 3 is a schematic diagram showing a thermal model 300 that may be used for estimating the temperature of the susceptor 108. The thermal model 300 may be implemented using the processing circuitry of the aerosol generating device 100. For example, the thermal model 300 may be implemented using software, or may be implemented by physical circuitry, e.g. without requiring an external controller.

The thermal model 300 is a thermal circuit model which models heat flow by analogy to an electrical circuit. Heat flow is represented by current, temperatures are represented by voltages, heat sources are represented by constant current sources, thermal resistances are represented by resistors, and thermal capacitances are represented by capacitors.

As seen in FIG. 3:

$\dot{Q}_1$ is the power dissipated at the susceptor 108 (i.e. the rate of heat flow from the susceptor 108);

$C_T$ is the thermal capacity of the consumable 106;

$R_{cond}$ is the thermal resistance of the consumable 106 to heat transfer via conduction;

$R_{conv}$ is the thermal resistance of the consumable 106 to heat transfer via convection;

$R_{rad}$ is the thermal resistance of the consumable 106 to heat transfer via radiation;

$T_{int}$ is the internal temperature of the consumable 106 (which corresponds to the temperature of the susceptor 108);

$T_{sensor}$ is the temperature measured at the exterior surface 112 of the consumable 108 by the temperature sensor 110; and $T_{amb}$ is the ambient temperature measured away from the heating influence of the susceptor 108.

The power dissipated at the susceptor 108 is equal to the rate of heat flow in the two parallel paths:

$$\dot{Q}_1=\dot{Q}_2+\dot{Q}_3$$

The thermal capacity of the consumable 106 is defined as:

$$C_T = \lim_{\Delta T\to 0}\frac{\Delta Q}{\Delta T}$$

where ΔQ is the amount of heat that must be added to the consumable 106 object (of mass M) in order to raise its temperature by ΔT. Hence, $\dot{Q}_2$ may be written as:

$$\dot{Q}_2 = C_T\frac{\partial T_{int}}{\partial t}$$

where t is time. The total thermal resistance $R_{total}$ is given by:

$$R_{total} = R_{cond} + \frac{R_{conv}R_{rad}}{R_{conv}+R_{rad}}$$

Using the general principle that the temperature drop ΔT across a given absolute thermal resistance R with a given heat flow $\dot{Q}$ is given by:

$$\Delta T=\dot{Q}\times R$$

It follows that:

$$\dot{Q}_3 = \frac{T_{int}-T_{amb}}{R_{total}}$$

Hence, $\dot{Q}_1$ can be rewritten as:

$$\dot{Q}_1 = C_T\frac{\partial T_{int}}{\partial t} + \frac{T_{int}-T_{amb}}{R_{total}}$$

The internal temperature of the consumable $T_C$ can then be estimated with knowledge of $\dot{Q}_1$, $R_{total}$, $T_{amb}$, and $C_T$. The skilled person will appreciate that $\dot{Q}_1$ may be calculated based on the power supplied to the one or more inductors 102 and a pre-characterised value for the energy transfer efficiency to the susceptor 108.

The thermal model 300 may also be utilised to update the values for the thermal resistance and thermal capacitance based on the temperature measured at the exterior surface 112 of the consumable 108. Again, using the general principle that the temperature drop ΔT across a given absolute thermal resistance R with a given heat flow $\dot{Q}$ is given by:

$$\Delta T=\dot{Q}\times R$$

It follows that:

$$T_{sensor}=T_{int}-(\dot{Q}_2\times R_{cond})$$

Substituting for $\dot{Q}_2$ gives:

$$T_{sensor} = T_{int} - \left(C_T \frac{\partial T_C}{\partial t} \times R_{cond}\right)$$

Hence, using this relationship, the values of $C_T$ and $R_{cond}$ may be updated based on the measured value of $T_{sensor}$, i.e. the temperature measured at the exterior surface 112 of the consumable 106. For example, a measured value of $T_{sensor}$ may be compared an estimated value of $T_{sensor}$ that is estimated using the above equation. The values of $C_T$ and $R_{cond}$ may be adjusted to minimise the error between the measured and estimated value.

Of course, it will be understood that the thermal model 300 is simply one possible thermal model according to the invention, and alternative thermal models may also be used to determine an estimated temperature of the susceptor 108 and provide updated values for the thermal properties.

Figure 4:
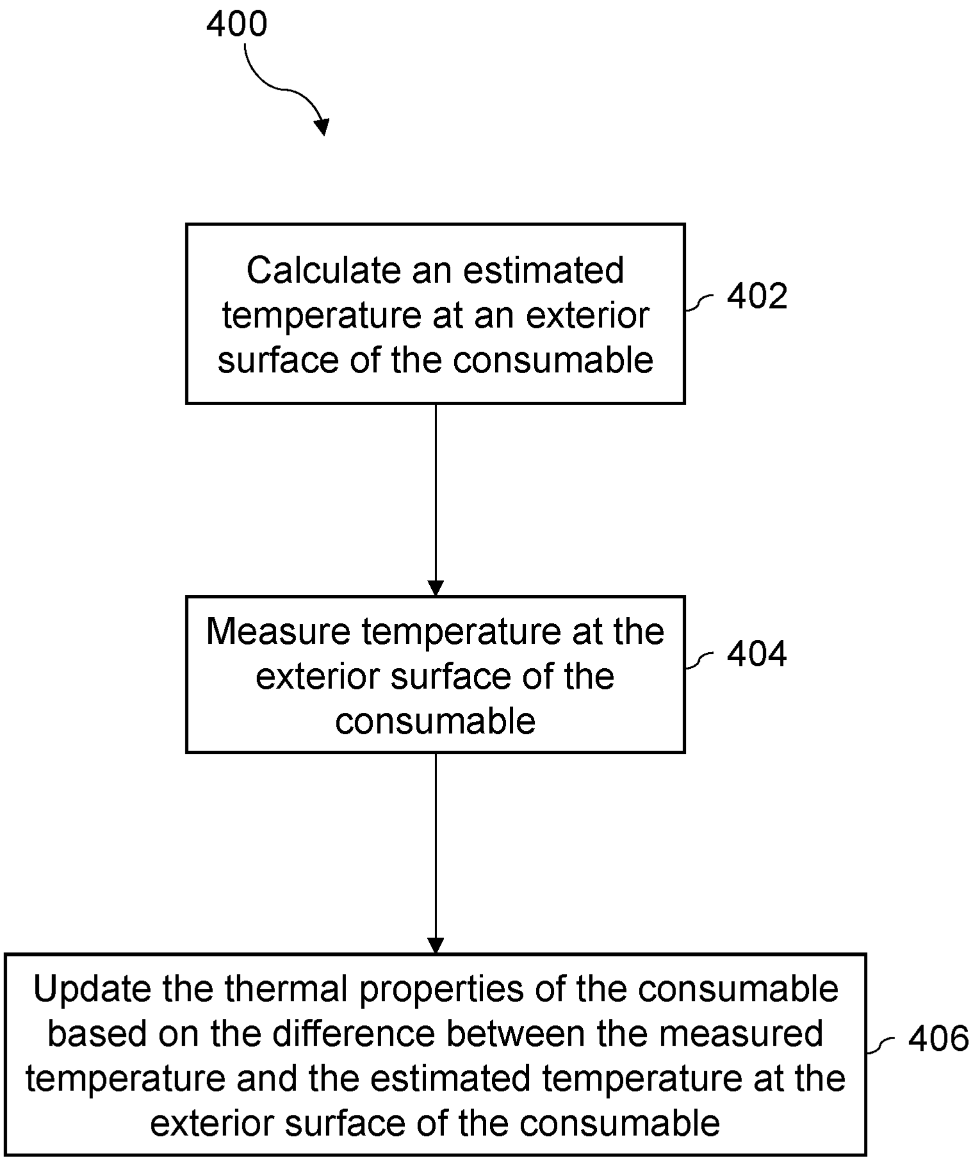
FIG. 4 is a flowchart showing method steps for updating the thermal properties of a consumable in an embodiment of the invention.

FIG. 4 illustrates a method 400 of updating the thermal properties of a consumable 106 in an embodiment of the invention. The method 400 may form part of method 200.

Although initial (e.g. default or pre-characterised) values for the thermal resistance and thermal capacity of the consumable 106 may be used to estimate the temperature of the susceptor 108, as the thermal properties of the consumable 106 are known to vary over time, it is advantageous to continuously update the thermal properties during operation of the aerosol generating device 100. For example, factors such as dirt inside the heating chamber 104, ageing of components, moisture content, manufacturing tolerances or varying compositions of consumable 106 may lead to a variation in the values of thermal resistance and thermal capacitance over the life of the aerosol generating device 100. Hence, updating the values of thermal resistance and thermal capacitance during operation of the aerosol generating device 100 leads to more accurate temperature estimation of the susceptor 106, and thus improved performance of the aerosol generating device 100.

Initially, the values of thermal resistance and thermal capacitance used to calculate the estimated temperature of the susceptor 108 may be initial (e.g. default) values which have been pre-characterised during product development. However, once the heating operation of the aerosol generating device 100 has begun, method 400 may be used to provide updated values for thermal resistance and thermal capacitance which may then be used to calculate the estimated temperature of the susceptor 108.

Method 400 begins at step 402, and an estimated temperature at an exterior surface 112 of the consumable 106 is calculated. For example, the temperature at the exterior surface 112 of the consumable 106 may be calculated using a thermal model, such as the thermal model 300 described above.

At step 404, the actual temperature at the exterior surface 112 of the consumable 106 is measured using the temperature sensor 110.

At step 406, the measured temperature at the exterior surface 112 of the consumable 106 is compared to the estimated temperature at the exterior surface 112 of the consumable 106, and the thermal properties of the consumable 106 are updated based on the difference between the values. In particular, the values for thermal capacity and thermal resistance of the consumable 106 may be adjusted to minimise the error between the measured and estimated temperature at the exterior surface 112 of the consumable 106.

In one example, the error may be minimised (and the thermal properties updated) using an extended an extended Kalman filter. In another example, a recursive least-square filter may be used. In another example, a variation of parameters method may be used. In another example, a characteristic mapping method may be used.

The updated values for thermal resistance and thermal capacitance may then be used in step 210 of method 200, in order to calculate the estimated temperature of the susceptor 108. For example, the updated values for thermal resistance and thermal capacitance may be fed back into the thermal model 300, or another suitable thermal model. The updated values will replace the initial for thermal resistance and thermal capacitance, or will replace the current values for thermal resistance and thermal capacitance (i.e. the previously updated values).

Of course, the skilled person will appreciate that, if the initial (or current) values for thermal resistance and thermal capacitance are optimal, i.e. the values already minimise the error between the measured and estimated temperature at the exterior surface 112 of the consumable 106, the values for thermal resistance and thermal capacitance may not be updated.

The invention claimed is:

1. A method of controlling an aerosol generating device, comprising:

measuring an ambient temperature by a temperature sensor operatively connected to the aerosol generating device;

receiving operating parameters of the aerosol generating device, wherein the operating parameters comprise:

the measured ambient temperature; and an aspect of a power supplied to an inductor of the aerosol generating device;

determining an estimated temperature of a susceptor disposed within a consumable for the aerosol generating device based on the operating parameters, wherein the estimated temperature is determined during an induction heating of the susceptor by the inductor; and controlling the power supplied to the inductor based on the estimated temperature of the susceptor, wherein the estimated temperature of the susceptor is determined based on the operating parameters of the aerosol generating device and based on thermal properties of the consumable, and wherein the thermal properties of the consumable comprise:

thermal capacity; and thermal resistance.

2. The method of claim 1, wherein the aspect of the power supplied to the inductor comprises at least one of:

current supplied to the inductor;

voltage supplied to the inductor; or wattage supplied to the inductor.

3. The method of claim 1, wherein the power supplied to the inductor is controlled using a proportional-integral-derivative controller.

4. The method of claim 1, wherein the power supplied to the inductor is controlled based on the difference between the estimated temperature of the susceptor and a target temperature of the susceptor.

5. The method of claim 1, further comprising:
suspending power supply to the inductor when the estimated temperature of the susceptor reaches a threshold value.

6. The method of claim 1, further comprising:
updating the thermal properties of the consumable during the induction heating of the susceptor.

7. The method of claim 6, further comprising:
measuring, using the temperature sensor, a temperature at an exterior surface of the consumable; and
updating the thermal properties of the consumable based on the measured temperature.

8. The method of claim 6, wherein the updated thermal properties of the consumable are determined using at least one of:
an extended Kalman filter;
a recursive least-square filter;
a variation of parameters method; or
a characteristic mapping method.

9. An aerosol generating device comprising processing circuitry configured to perform the method of claim 1.

10. A computer-readable medium comprising executable instructions which, when executed by processing circuitry, cause the processing circuitry to perform the method of any of claim 1.

11. A method of controlling an aerosol generating device, comprising:
measuring an ambient temperature by a temperature sensor operatively connected to the aerosol generating device;
receiving operating parameters of the aerosol generating device, wherein the operating parameters comprise:
the measured ambient temperature; and
an aspect of a power supplied to an inductor of the aerosol generating device;
determining an estimated temperature of a susceptor disposed within a consumable for the aerosol generating device based on the operating parameters, wherein the estimated temperature is determined during an induction heating of the susceptor by the inductor; and
controlling the power supplied to the inductor based on the estimated temperature of the susceptor,
wherein the estimated temperature of the susceptor is determined based on the operating parameters of the aerosol generating device and based on thermal properties of the consumable, and
wherein the method further comprises updating the thermal properties of the consumable during the induction heating of the susceptor.

12. The method of claim 11, wherein the aspect of the power supplied to the inductor comprises at least one of:
current supplied to the inductor;
voltage supplied to the inductor; or
wattage supplied to the inductor.

13. The method of claim 11, wherein the power supplied to the inductor is controlled using a proportional-integral-derivative controller.

14. The method of claim 11, wherein the power supplied to the inductor is controlled based on the difference between the estimated temperature of the susceptor and a target temperature of the susceptor.

15. The method of claim 11, further comprising:
suspending power supply to the inductor when the estimated temperature of the susceptor reaches a threshold value.

16. The method of claim 11, further comprising:
measuring, using the temperature sensor, a temperature at an exterior surface of the consumable; and
updating the thermal properties of the consumable based on the measured temperature.

17. The method of claim 16, further comprising:
calculating an estimated temperature at the exterior surface of the consumable; and
updating the thermal properties of the consumable based on the difference between the measured temperature at the exterior surface of the consumable and the estimated temperature at the exterior surface of the consumable.

18. The method of claim 11, wherein the updated thermal properties of the consumable are determined using at least one of:
an extended Kalman filter;
a recursive least-square filter;
a variation of parameters method; or
a characteristic mapping method.

19. An aerosol generating device comprising processing circuitry configured to perform the method of claim 11.

20. A computer-readable medium comprising executable instructions which, when executed by processing circuitry, cause the processing circuitry to perform the method of claim 11.

* * * * *